(12) United States Patent
Arrazat et al.

(10) Patent No.: US 10,461,861 B2
(45) Date of Patent: Oct. 29, 2019

(54) PHOTOVOLTAIC RECEIVER OPTIMISED FOR COMMUNICATION BY CODED LIGHT

(71) Applicant: Garmin Switzerland GmbH, Schaffhausen (CH)

(72) Inventors: Brice Arrazat, Rousset (FR); Emilie Bialic, Rousset (FR); Sylvain de Vecchi, Rousset (FR)

(73) Assignee: Garmin Switzerland GmbH (CH)

(*) Notice: Subject to any disclaimer, the term of this patent is extended or adjusted under 35 U.S.C. 154(b) by 0 days.

(21) Appl. No.: 16/067,242

(22) PCT Filed: Dec. 30, 2016

(86) PCT No.: PCT/FR2016/000219
§ 371 (c)(1),
(2) Date: Jun. 29, 2018

(87) PCT Pub. No.: WO2017/115024
PCT Pub. Date: Jul. 6, 2017

(65) Prior Publication Data
US 2019/0028194 A1 Jan. 24, 2019

(30) Foreign Application Priority Data

Dec. 31, 2015 (FR) .................................... 15/02752

(51) Int. Cl.
*H04B 10/00* (2013.01)
*H04B 10/116* (2013.01)
*H04B 10/079* (2013.01)

(52) U.S. Cl.
CPC ..... *H04B 10/116* (2013.01); *H04B 10/07953* (2013.01)

(58) Field of Classification Search
CPC ... H04B 10/116; H04B 10/112; H04B 10/114; H04B 10/1143; H04B 10/1149;
(Continued)

(56) References Cited

U.S. PATENT DOCUMENTS

| 7,212,749 B2 * | 5/2007 | Hamilton | ............. H04B 10/693 250/214 A |
| 2006/0275040 A1 * | 12/2006 | Franklin | ............ H04B 10/1141 398/172 |

(Continued)

OTHER PUBLICATIONS

International Search Report (PCT/ISA/210) dated Mar. 7, 2017, by the French Patent Office as the International Searching Authority for International Application No. PCT/FR2016/000219.

*Primary Examiner* — Hanh Phan
(74) *Attorney, Agent, or Firm* — Samuel M. Korte; Max M. Ali

(57) ABSTRACT

A coded-light communication device is described, in which the communication has an initial signal-to-noise ratio, which varies according to the lighting conditions. The device comprises at least one photodetector-type light receiver comprising an anode and a cathode and having an initial shunt resistance. The receiver is capable of being simultaneously exposed to a coded light source carrying a signal and a non-coded light source. The anode and cathode are short-circuited by at least one short-circuit resistance arranged inside the photodetector, having a value selected so that the new value of the shunt resistance of the photodetector resulting from the connection of the initial shunt resistance and the short-circuit resistance gives the communication device a new resultant signal-to-noise ratio which remains substantially independent of the intensity of the non-coded light.

17 Claims, 3 Drawing Sheets

(58) Field of Classification Search
CPC ............ H04B 10/1123; H04B 10/1125; H04B 10/1129; H04B 10/67; H04B 10/69; H04B 10/691
USPC ........ 398/172, 118, 119, 127, 128, 130, 115, 398/135, 136, 164, 202, 208, 209, 212, 398/213, 210
See application file for complete search history.

(56) References Cited

U.S. PATENT DOCUMENTS

| | | | |
|---|---|---|---|
| 2009/0297166 A1* | 12/2009 | Nakagawa | G09F 9/33 398/172 |
| 2012/0112046 A1 | 5/2012 | Nakamura et al. | |
| 2015/0162984 A1 | 6/2015 | Liu et al. | |

* cited by examiner

--PRIOR ART--

--PRIOR ART--

--PRIOR ART--

PHOTOVOLTAIC RECEIVER OPTIMISED FOR COMMUNICATION BY CODED LIGHT

TECHNICAL FIELD OF THE INVENTION

The present invention relates to devices for communication by coded light of VLC (acronym for 'visible light communication') type, also known under the name Li-Fi (acronym for 'light fidelity'), and more particularly with respect to the performance of the optical receiver that contributes inter alia to the bit rate of the communication.

PRIOR ART

Devices for communication by coded light (VLC or Li-Fi) use light to transmit information between two remote points. A system for communication by coded light is generally formed of a light source comprising at least one light-emitting diode (commonly referred to using its acronym 'LED') and a light receiver of photoreceptor type. LED(s) may have a dual function of both illumination and communicating coded information. LEDs may be:
- LEDs emitting a white light and that are formed of a blue chip and associated with a phosphor,
- LEDs emitting a specific color formed of one or more color chips,
- LEDs emitting in the infrared or the ultraviolet in a manner imperceptible to the eye.

LEDs emit a luminous flux with a characteristic emission spectrum, different from the spectrum of natural light. Luminous fluxes are measured in lux, but in order to make a distinction with natural light, the luminous fluxes of LEDs whose light is coded are termed lux Li-FL Lux Li-Fi is therefore the unit of measurement of the luminous flux measured using a luxmeter when the light that is used is modulated and generated by LEDs. The illumination levels that are used for Li-Fi communications are generally of three types: tow 'Li-Fi flux', which is a luminous flux lower than 400 lux Li-Fi. 'Medium Li-Fi flux', which is a luminous flux of between 400 and 10 000 lux Li-Fi. 'High Li-Fi flux', which is a luminous flux higher than 10 000 lux Li-Fi.

LEDs supply a luminous signal within the wavelength ranges of the visible (Li-Fi), the infrared (IR) and the ultraviolet (UV), the intensity of which is modulated depending on the information to be transmitted. The emission of LEDs in the visible spectrum (Li-Fi) has the advantage of allowing a dual function of both illumination and transmitting data, and the physical features of LEDs make it possible to contemplate bit rates of the order of a few hundred megabits per second for dedicated systems.

The majority of existing photodetectors associated with an information-processing system make it possible to analyze the variation in the amplitude of the received luminous signal and to deduce the transmitted information therefrom. The majority of photovoltaic surfaces are also photoreceptors that reproduce the variations in the received optical signal in the form of variations in the generated electrical signal.

Generally, Li-Fi reception systems receive light coming from all directions in space without distinction, whether this be ambient light or modulated light emitted by LEDs of a Li-Fi emitter. However, a technical problem then arises as the majority of known photoreceptors are highly sensitive to ambient light and rapidly saturate in the presence of a high ambient luminous flux. On account of this, they no longer allow the variation in the luminous intensity of the Li-Fi signal to be transcribed when saturation sets in. These photoreceptors are still very good receivers as long as the Li-Fi flux is not too high (<5000 lux), but their performance in terms of transmission speed (bit rate) decreases rapidly above 5000 lux, thereby requiring the implementation of information-processing means and of repeated automatic calibration of the communication channel using learning and adjustment techniques whose final performance is still highly limited.

One solution for rectifying this problem is, in the detector, to 'discriminate' the light coming from Li-Fi LEDs from other ambient light sources in order to increase the signal-to-noise ratio of the Li-Fi signal and therefore to increase and to stabilize the transmission bit rate. There are 'discrimination' solutions that use lenses, possibly Fresnel lenses or diffractive optical elements, which concentrate the coded light coming from LEDs on the photoreceptor in order to increase the signal-to-noise ratio of the Li-Fi signal. However, these solutions 'with lenses' require the photoreceptor to receive the coded signal coming from just one direction, thereby limiting applications to devices that remain stationary.

Now, it has been shown by empirical tests that the sensitivity of the SNR ratio decreases, or even disappears, when the shunt resistance Rsh decreases substantially below the shunt resistance value that is typically found in photovoltaic cells available in industry. These cells generally have a shunt resistance of the order of 1500 to 2000 $\Omega \cdot cm^2$. This is a shunt resistance that takes into account the surface area of the photoreceptor and, if this is made of photovoltaic material, of the photovoltaic surface area percentage.

AIM OF THE INVENTION

The main aim of the invention is to improve the signal-to-noise ratio of Li-Fi communication, even when the photoreceptor is receiving, at the same time, uncoded ambient light that puts said receiver into a luminosity range much higher than 5000 lux. In spite of this intense light reception, said photoreceptor will have to keep the SNR (signal-to-noise ratio) substantially constant even in the event of strong variations in the ambient luminosity. The device implementing the invention will then be compatible with mobile communication means such as mobile telephones, GPSs, tablet computers and, generally, with Li-Fi communication devices situated in any type of transport vehicle.

In the term 'signal-to-noise ratio' in the sense of the present invention, the word 'noise' is defined as an electronic noise associated with the reception system, including the electrical noise intrinsic to the photoreceptor. This noise exists in the absence of uncoded light. 'Shot' noise (present in any electrical circuit in which the transfer of energy is described by quantum phenomena), noise linked to the current in a diode that is due to the random emission of electrons through a thermionic effect and that arises in particular in the load resistor, photonic noise due to the corpuscular nature of the electromagnetic radiation, and Johnson noise or thermal noise due to the random movements of charges brought about by the temperature, are known.

In order to achieve this aim of improving the signal-to-noise ratio, it will be necessary to design photodetectors having a shunt resistance Rsh lower than customary values that are found in known photodetectors.

SUMMARY OF THE INVENTION

One subject of the invention is a device for communication by coded light in which the communication has an initial signal-to-noise ratio, denoted SNR1, that is variable depending on the illumination conditions, this device comprising at least one light receiver of photoreceptor type including an anode and a cathode and having an initial shunt resistance with a value Rsh1, this receiver being liable to be exposed simultaneously to a source of coded light carrying a signal and to a source of uncoded light, characterized in that said anode and cathode are short-circuited by at least one short-circuit resistor Rp arranged inside the photoreceptor, with a value Rsh2 chosen such that the new value of the shunt resistance of said photoreceptor, denoted Rsh3 and resulting from the connection of the initial shunt resistance Rsh1 and of the short-circuit resistor Rp, gives the communication device a new resultant signal-to-noise ratio SNR2 that remains substantially independent of the intensity of said uncoded light.

In order to achieve an SNR ratio that remains substantially stable even when the intensity of the uncoded light (for example the ambient light) increases, the invention makes provision to choose a shunt resistance Rp such that the equivalent shunt resistance Rsh3 (formed of the resistances Rsh1 and Rsh2 in parallel) is lower than a predetermined threshold value.

Tests have shown that the predetermined threshold value of the equivalent shunt resistance Rsh3, taking into account the active surface area of the photodetector and the photovoltaic surface area percentage (in the case of a square photodetector based on photovoltaic material), is less than a value of the order of 1000 $\Omega \cdot cm^2$. In other words, if the photodetector were to be a square photovoltaic cell with a surface area of 1 $cm^2$, it would have to have an equivalent shunt resistance of less than 1000$\Omega$. The target shunt resistance threshold is therefore able to be calculated for a given photovoltaic cell, depending on its surface area and on its percentage of coverage with photovoltaic material.

The source of coded light may be coded either in terms of amplitude or in terms of phase in the case of a coherent source, or by varying its luminous intensity in the case of an incoherent source.

The majority of known (non-photovoltaic) photoreceptors are highly sensitive to ambient light, and rapidly saturate in the presence of a high ambient luminous flux. On account of this, they do not allow the variation in the luminous intensity of the Li-Fi signal to be transcribed when saturation sets in. Nevertheless, these known photoreceptors are often very good receivers as long as the Li-Fi flux is not too high (<5000 lux).

The device according to the invention comprises a photoreceptor that may be a module formed of at least one photovoltaic cell that generates a significant electric voltage from light radiation and that makes it possible to receive a Li-Fi signal even in an environment with a high ambient luminous flux, and to do so without the abovementioned saturation phenomenon setting in. Said photovoltaic module is capable of receiving a Li-Fi signal coming from a Li-Fi source situated outdoors in the presence of solar radiation, without creating interference in terms of reception, in contrast to other photoreceptors. Specifically, said device has a particular feature, which is that, for a given Li-Fi illumination level, there is an internal resistance value (shunt resistance Rsh2) for said module that stabilizes the SNR and makes photodetection insensitive to the increase in the ambient luminous flux.

The photoreceptor according to the invention has the feature of a stable signal-to-noise ratio (SNR1 substantially equal to SNR2). For a given lux Li-Fi level, when the ambient lux level is increased or decreased within a defined range of illumination levels (dependent on said photovoltaic receivers), the SNR varies little in the useful frequency band, that is to say that the variations in the SNR level in the given frequency band remain below 5%.

As a result, the photovoltaic optical receiver, which forms part of the invention, makes it possible to optimize optical communication independently of the ambient luminous environment. Said photovoltaic receiver operates without the communication deteriorating, that is to say without the bit rate dropping, when it is operating in low ambient light (this is the case for an indoor environment for example of the order of 400 lux Li-Fi) or in high ambient light (outdoor environment, for example of the order of 50 000 lux).

The stability of the SNR of the device makes it easier to implement the information-processing means, and makes it possible to dispense with repeated automatic calibration and therefore with channel learning and channel adjustment techniques. The information-processing means may then dispense with the channel adjustment step.

In one particular embodiment of the invention, the photoreceptor is a photovoltaic cell of any type, such as for example a cell made of crystalline silicon, or amorphous silicon or a stack of photosensitive thin films. The internal structure of the photovoltaic cell may be highly diverse, but in any case the internal shunt resistance (Rsh1) remains a feature intrinsic to each cell. It is this initial shunt resistance (Rsh1) that is lowered to a new lower value (Rsh3) by a shunt (Rsh2), as is provided for by the present invention.

According to another particular embodiment, said photoreceptor is semitransparent and is formed of an array of photovoltaic cells according to the features of the invention, these cells being spaced apart from one another by zones of transparency. The size of said cells may be smaller than 100 microns, thereby making said receiver semitransparent and giving it a uniform appearance, without the resolving power of the eye being able to distinguish the cells individually.

In the previous embodiment, all of the photovoltaic cells have their shunt resistance Rsh1 that has been lowered by a shunt Rsh2 in order to optimize reception and Li-Fi information transmission speed performances, in particular in intense light. To perform this shunt adjustment, it is possible to limit the number of cells that are 'shunted' in order to get close to the ideal operating value. To this end, the short-circuit resistor Rp is positioned only on a proportion P % of photovoltaic cells of said array of cells, such that the overall shunt resistance (Rsh3) of the photoreceptor will be related to this said proportion of P %.

The creation of said short circuit of value Rp between the cathode and the anode of the cells may be achieved in various ways, depending on the types of cell that are used, in particular this electrical junction may be of wired type or printed surface type, and may be formed of any type of conductive or semiconductive material.

In other embodiments, said communication device also receives uncoded ambient light, which may be natural light (sunlight) or artificial light coming from any type of lamp, such as for example LEDs ('light-emitting diodes'), fluorescent tubes, incandescent lamps or sodium-vapor lamps.

To increase the intensity of the coded light that is received by said receiver, one particular embodiment (not illustrated) comprises convergent optical lenses or diffractive elements that make it possible for example to concentrate the light between the source of the coded light and the active surface of said photoreceptor.

In another embodiment, the lenses or diffractive optical elements are positioned between the photovoltaic cells and an electronic image situated behind the photoreceptor that is semitransparent. The lenses, in this particular embodiment, concentrate the light from the electronic images through transparent spaces situated between the cells, thereby making the image visible through said photoreceptor.

As said device for communication by coded light is able to operate in outdoor sunlight, another subject of the present invention is all types of mobile apparatus that incorporate the communication device according to the invention, such as for example mobile telephones or GPSs (abbreviation for 'global positioning systems').

As said device for communication by coded light is able to operate with a semitransparent receiver, another subject of the present invention is all types of semitransparent surface that incorporate the communication device according to the invention, such as for example glazings for all types of building, glazings for all types of transport vehicle or for all types of electronic display screen.

DETAILED DESCRIPTION

The invention will be better understood with the aid of the detailed description thereof, with reference to appended FIGS. 1 to 8.

Figure 1:
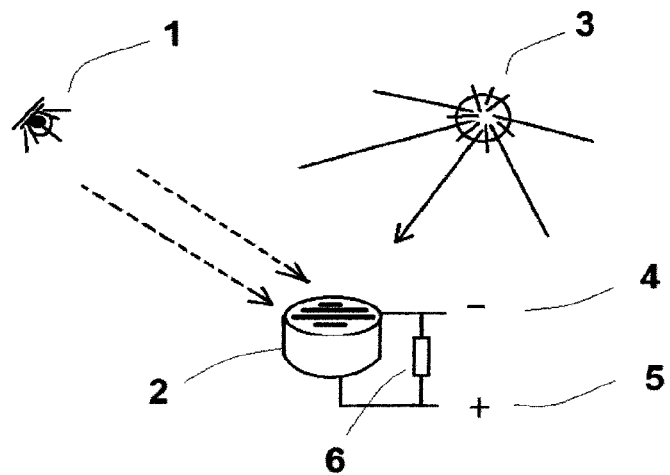
FIG. 1 shows the various components of the communication device.

With reference to FIG. 1, the device for communication by coded light according to the invention comprises:
- a light receiver of photoreceptor type (2) of which the value of its shunt resistance is lowered by placing a short circuit (6) with non-zero resistance between its anode (5) and its cathode (4).
- a source of coded light (1) carrying a signal.
- a source of uncoded light (3) of which part of its light illuminates said photoreceptor (2); this uncoded light (3) may be natural sunlight or artificial light.

The photoreceptor (2) therefore receives both coded light (1) and uncoded light (3). It may be shown that the quality of the reception of the signal depends on several factors, including the ratio between the intensity of the signal and the intensity of the uncoded light (3), and, more generally, between the intensity of the signal and the intensity of the background 'noise' that may be electronic and/or optical in nature. The SNR of a communication (signal-to-noise ratio) is representative of the quality of the communication and of its limits, in particular in terms of transmission bit rate.

Figure 2:
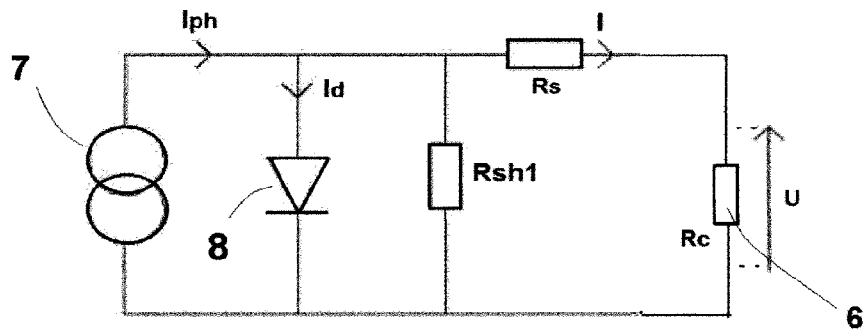
FIG. 2 is a depiction, modeled in the form of an equivalent circuit diagram, of the behavior of a conventional photoreceptor.
Figure 3:
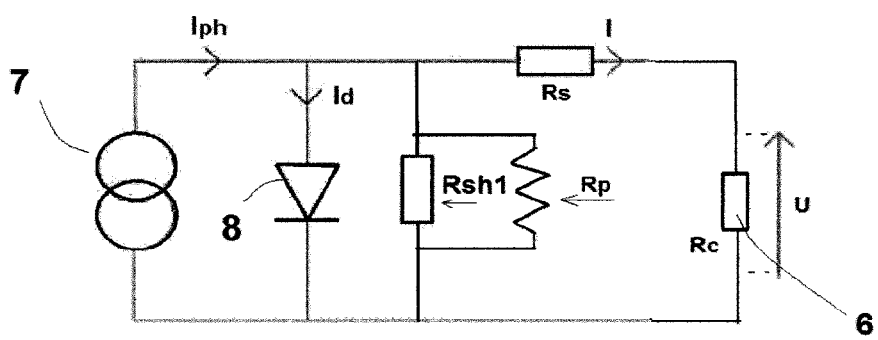
FIG. 3 is a depiction, modeled in the form of an equivalent circuit diagram, of the behavior of the photoreceptor according to the invention.

FIGS. 2 and 3 are modeled depictions of a photoreceptor.

FIG. 2 shows the model, in the form of an equivalent circuit diagram, of a conventional photoreceptor that behaves in the same way as if an electricity generator (7), a diode (8) and a shunt resistance (Rsh1) that is intrinsic to the component were placed in parallel. A series resistance (Rs) puts said photoreceptor in connection with an external resistive load (Rc) across the terminals of which there is a potential difference (U) that is proportional to the overall luminous intensity (1 and 3) received by the photoreceptor (2).

FIG. 3 shows the model, in the form of an equivalent circuit diagram, of a photoreceptor according to the invention that comprises, in addition to the conventional elements of a photoreceptor (FIG. 2), a short circuit Rp of non-zero resistance (Rsh2) positioned in parallel with the shunt resistance (Rsh1) of the photoreceptor. The result of this short circuit is that it lowers the overall shunt resistance (denoted Rsh3) of the photoreceptor (2).

Figure 4:
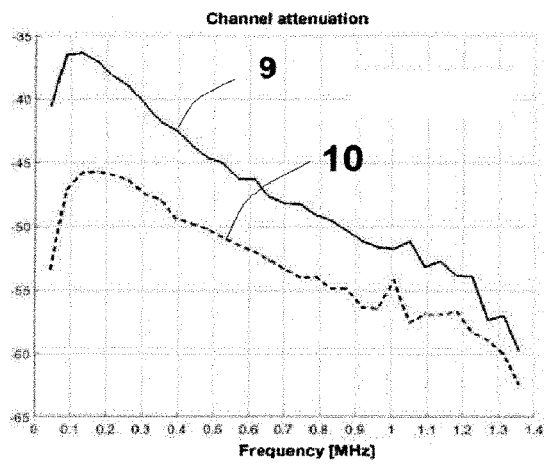
FIG. 4 is a graph that highlights the attenuation of the Li-Fi signal in a conventional photoreceptor in the presence of intense ambient light.

FIG. 4 shows the variation in the intensity of a signal received by a conventional photoreceptor as a function of its emission frequency (up to 1.4 megahertz) in the case (curve 9) of reception of Li-Fi light emitted at 6600 lux, without uncoded light, and in the case (curve 10) of reception of the same Li-Fi coded light at 6600 lux but with, in addition, uncoded light of 36 000 lux. A general attenuation of the Li-Fi signal due to the presence (additional reception) of uncoded ambient light (3) is clearly noted.

Figure 5:
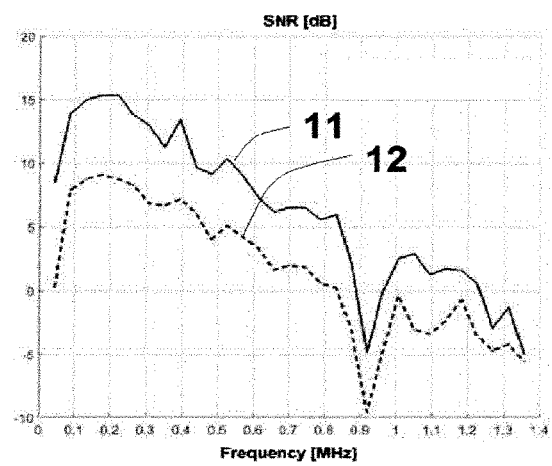
FIG. 5 is a graph that shows the decrease in the SNR of a conventional photoreceptor in the presence of intense light.

FIG. 5 takes up the same operating mode as that of FIG. 4, that is to say Li-Fi reception at 6600 lux (curve 11) and Li-Fi reception at 6600 lux plus ambient light of 36 000 lux (curve 12) on a conventional photoreceptor. The two curves 11 and 12 show the variation in the SNR (dB) as a function of the transmission frequency (up to 1.4 megahertz). As in the case of FIG. 4, an attenuation of the quality of the transmission in the presence (additional reception) of uncoded ambient light (3) is clearly noted.

Figure 6:
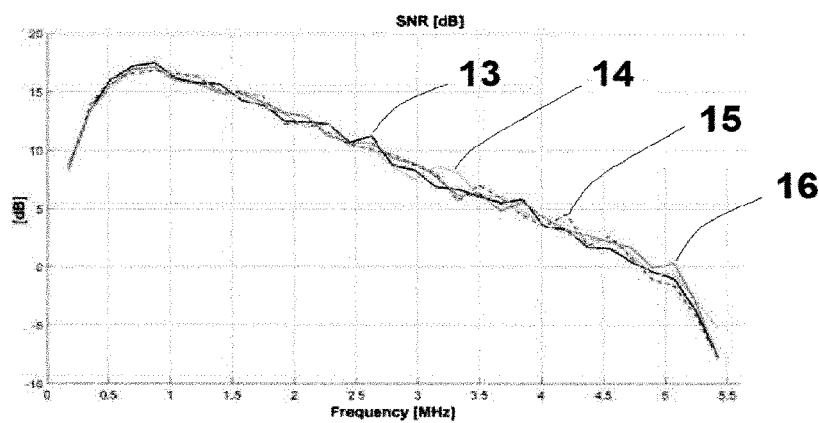
FIG. 6 is a graph that shows the stability of the SNR even in the presence of varying intense ambient light in the case of a photoreceptor according to the invention.

FIG. 6 contains four curves (13, 14, 15, 16) that are representative of the evolution of the SNR (dB) as a function of the transmission frequency (up to 5.5 megahertz) and as a function of four additional illumination levels received by a photoreceptor (2) according to the invention, that is to say a photoreceptor whose shunt resistance has been lowered by a resistive short circuit with a non-zero value. The value of the intensity of the Li-Fi flux is identical for the four curves and has a value of 750 lux. The value of the additional uncoded luminous intensity (3) for each curve is as follows: curve 13=0 lux; curve 14=6000 lux; curve 15=17 000 lux; curve 16=32 000 lux.

It is then noted that, in contrast to preceding FIGS. 4 and 5, the curves 13, 14, 15 and 16 have substantially the same shape and the same amplitude, this meaning that a stable SNR is present regardless of the intensity of the uncoded light (3) that has been added to the coded Li-Fi light.

Figure 7:
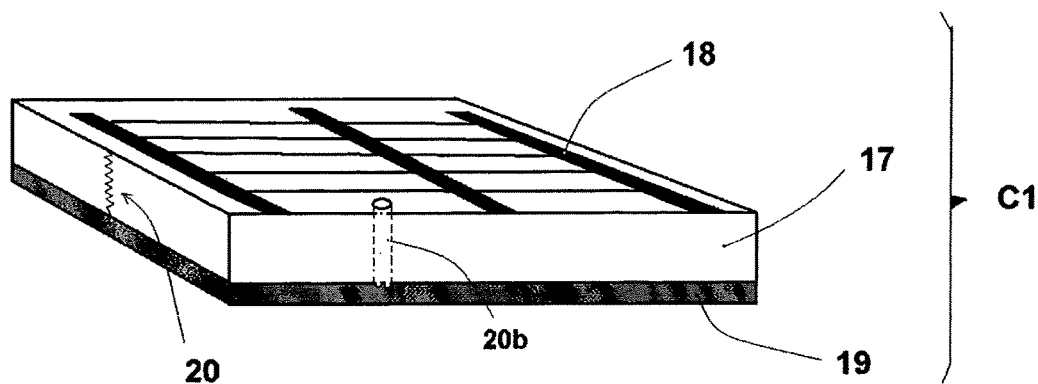
FIG. 7 is a schematic three-dimensional depiction of a photovoltaic cell made of crystalline silicon and of the position of a short circuit according to the invention.

FIG. 7 shows a photovoltaic cell (C1) used as a photoreceptor (2) in the communication device according to the invention. The photovoltaic cell (C1) is formed of a doped crystalline silicon film (17) on one face of which an electronic collection grid (anode, 18) is deposited and on the other face of which an aluminum thin film (19) that acts as cathode for the cell (C1) is deposited. Between the two faces (18 and 19) there is created a resistive short circuit (20) that lowers the value of the shunt resistance of the photovoltaic cell (C1). This short circuit (20) may be created in various ways, such as for example: creating one or more wired junctions with a small diameter between the anode and the cathode at the periphery of the cell (on the edges), or else piercing one or more holes or vias (20b) through the cell using a laser method that makes it possible to deposit, on the walls of the hole, a conductive material that creates electrical conduction between the anode and the cathode.

Figure 8:
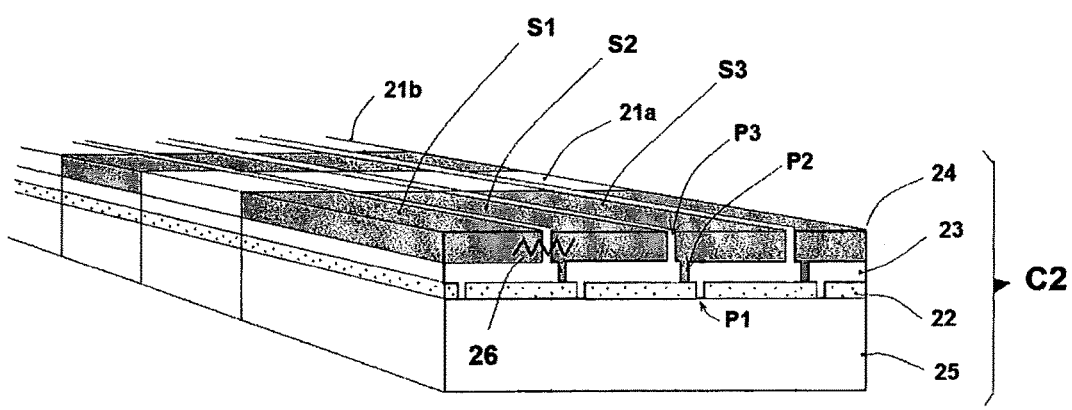
FIG. 8 is a schematic three-dimensional depiction of a photovoltaic cell made of amorphous silicon (thin film) and of the position of a short circuit according to the invention.

FIG. 8 shows a photovoltaic module (C2) used as a photoreceptor (2) in the communication device according to the invention. Said photovoltaic module C2 is formed of a transparent substrate (25), preferably made of glass, on which there is deposited a transparent conductive thin film of ZnO (22), and then, on top of that, an amorphous silicon active thin film (23), and then lastly, on top of that, an aluminum thin film (24). Said module is structured by way of a laser beam, so as to create, through ablation, an array of zones of transparency (21a, 21b) and an array of cells (S1, S2, S3) that are interconnected electrically with one another in series mode by virtue of separations (P1) at the surface of the anode, separations (P3) at the surface of the cathode and electrical junctions (P2) between the anode and the cathode at two contiguous cells. This structure, which is known to those skilled in the art, gives rise, for each cell (S1, S2, S3) of said photovoltaic module (C2), to an internal shunt resistance (not illustrated) that is substantially equal for all of said cells. In order to optimize this photoreceptor for communication in Li-Fi mode and outdoors, that is to say in the presence of sunlight, some contiguous cells are short-circuited (for example S1 and S2) by a short circuit (26) between the two anodes or between the two cathodes of said cells (S1, S2) so as to lower the overall shunt resistance of the photovoltaic module.

Specifically, as the cells are coupled in series mode, the shunt resistance of said module is the sum of the shunt resistances of all of the individual cells, and lowering the shunt resistance of a certain percentage of said cells lowers the shunt resistance of said module by the same percentage. The short circuits may be created for example by locally melting the aluminum thin film (24) at a certain number of separations between cathodes (P3), for example using the properties of a thermal laser beam.

Advantages of the Invention

Ultimately, the invention does indeed meet the set aims by making it possible to stabilize the signal-to-noise ratio (SNR) of a device for communication by coded light (Li-Fi), even when the photoreceptor of this device, at the same time, is receiving uncoded ambient light the luminosity of which is higher than 5000 lux, thereby making the device compatible with outdoor mobile communication means, such as mobile telephones, GPSs, tablet computers and, generally, with all types of transport vehicle.

The invention claimed is:

1. A communication device for communication by coded light in which the communication has an initial signal-to-noise ratio, denoted SNR1, that is variable depending on the illumination conditions, the communication device comprising at least one light receiver of photoreceptor type including an anode and a cathode and having an initial shunt resistance with a value Rsh1, the receiver being liable to be exposed simultaneously to a source of coded light carrying a signal and to a source of uncoded light,
wherein said anode and cathode are short-circuited by at least one short-circuit resistor Rp arranged inside the photoreceptor, with a value Rsh2 chosen such that the new value of the shunt resistance of said photoreceptor, denoted Rsh3 and resulting from the connection of the initial shunt resistance Rsh1 and of the short-circuit resistor Rp, gives the communication device a new resultant signal-to-noise ratio SNR2 that remains substantially independent of the intensity of said uncoded light,
wherein said photoreceptor is semitransparent and is formed of an array of photovoltaic cells spaced apart from one another by zones of transparency.

2. The communication device as claimed in claim 1, wherein the shunt resistance Rp is chosen so that the equivalent shunt resistance Rsh3 is lower than a predetermined threshold value.

3. The communication device as claimed in claim 2, wherein the predetermined threshold value of the equivalent shunt resistance Rsh3 is of the order of 1000 Ω·cm2.

4. The communication device as claimed in claim 1, wherein said source of coded light is coded either in terms of amplitude or in terms of phase in the case of a coherent source, or by varying its luminous intensity in the case of an incoherent source.

5. The communication device as claimed in claim 1, wherein said short-circuit resistor Rp is positioned only on a proportion of P % of the photovoltaic cells of said array of cells, such that the overall shunt resistance of the photodetector is related to this said proportion P %.

6. The communication device as claimed in claim 1, wherein the short-circuit resistor Rp is a junction of wired type or a printed surface, said junction being formed of any type of conductive or semiconductive material.

7. The communication device as claimed in claim 1, wherein the uncoded light is natural sunlight or artificial light coming from any type of lamp.

8. The communication device as claimed in claim 7, wherein the uncoded light is artificial light coming from a light-emitting diode (LED), a fluorescent tube, an incandescent lamp, or a sodium-vapor lamp.

9. The communication device for communication by coded light as claimed in claim 1, wherein said photoreceptor furthermore comprises at least one optical lens or diffractive or non-diffractive optical element, able to concentrate light radiation on or between active surfaces of said photoreceptor.

10. An apparatus, which incorporates a communication device as claimed in claim 1.

11. The apparatus as claimed in claim 10, wherein the apparatus includes a mobile telephone or a GPS device.

12. A semitransparent surface, which incorporates a communication device as claimed in claim 1.

13. The semitransparent surface as claimed in claim 12, wherein the semitransparent surface includes a glazing for a building, a transport vehicle glazing, or an electronic display screen.

14. The communication device as claimed in claim 1, wherein said photoreceptor is made of crystalline silicon, or amorphous silicon, or a stack of photosensitive thin films.

15. A communication device for communication by coded light in which the communication has an initial signal-to-noise ratio, denoted SNR1, that is variable depending on the illumination conditions, the communication device comprising at least one light receiver of photoreceptor type including an anode and a cathode and having an initial shunt resistance with a value Rsh1, the receiver being liable to be exposed simultaneously to a source of coded light carrying a signal and to a source of uncoded light,
wherein said anode and cathode are short-circuited by at least one short-circuit resistor Rp arranged inside the photoreceptor, with a value Rsh2 chosen such that the new value of the shunt resistance of said photoreceptor, denoted Rsh3 and resulting from the connection of the initial shunt resistance Rsh1 and of the short-circuit resistor Rp, gives the communication device a new resultant signal-to-noise ratio SNR2 that remains substantially independent of the intensity of said uncoded light, wherein the shunt resistance Rp is chosen so that the equivalent shunt resistance Rsh3 is lower than a predetermined threshold value.

16. The communication device as claimed in claim 15, wherein the predetermined threshold value of the equivalent shunt resistance Rsh3 is of the order of 1000 Ω·cm2.

17. The communication device as claimed in claim 15, wherein said photoreceptor is a photovoltaic cell.

* * * * *